United States Patent
Minton et al.

[11] 3,815,086
[45] June 4, 1974

[54] COMPULSORY SEAT BELTS

[76] Inventors: Leslie Graham Minton, 32 Nutbrook Ave., Tile Hill, Coventry CV4 9LD; Anthony Edward David Hughes, "Lyncrest" 58 Wellesbourne Rd., Mount Nod, Coventry CV5 7HN, both of England

[22] Filed: Oct. 26, 1971

[21] Appl. No.: 192,666

[30] Foreign Application Priority Data
Oct. 23, 1970  Great Britain.................... 50587/70
Dec. 12, 1970  Great Britain.................... 59382/70

[52] U.S. Cl................ 340/52 E, 180/82, 340/53, 340/61, 340/62, 340/81 F
[51] Int. Cl........................................... B60r 21/10
[58] Field of Search............ 180/82 C; 280/150 SB; 340/52 R, 52 E

[56] References Cited
UNITED STATES PATENTS
3,126,227  3/1964  Bollinger................. 340/52 E UX
3,226,674  12/1965  Eriksson................... 340/52 E UX
3,311,188  3/1967  Gutshall......................... 180/82 C
3,340,523  9/1967  Whitman..................... 340/52 E X
3,371,736  3/1968  Lewis et al.................. 340/52 R X
3,375,495  3/1968  Burns.............................. 340/52 R
3,401,765  9/1968  Hagon....................... 340/52 E UX
3,506,305  4/1970  Eineman et al............. 340/52 E X

*Primary Examiner*—John W. Caldwell
*Assistant Examiner*—Kenneth N. Leimer
*Attorney, Agent, or Firm*—Stowell & Stowell

[57] ABSTRACT

An automobile seat belt system ensures that the belts of occupied seats are properly worn. The system compares the amount of belt withdrawn from an inertia reel with the position of the seat and the angle of the seat back, and if the amount of belt is outside the normal range or the angle of the belt is abnormal in respect to the driver's or any occupied passenger seat, a warning device is actuated when the vehicle speed exceeds a predetermined low speed. The system may also lock any fastened seat belts when the transmission is placed in gear and when the vehicle speed exceeds the predetermined low speed.

4 Claims, 1 Drawing Figure

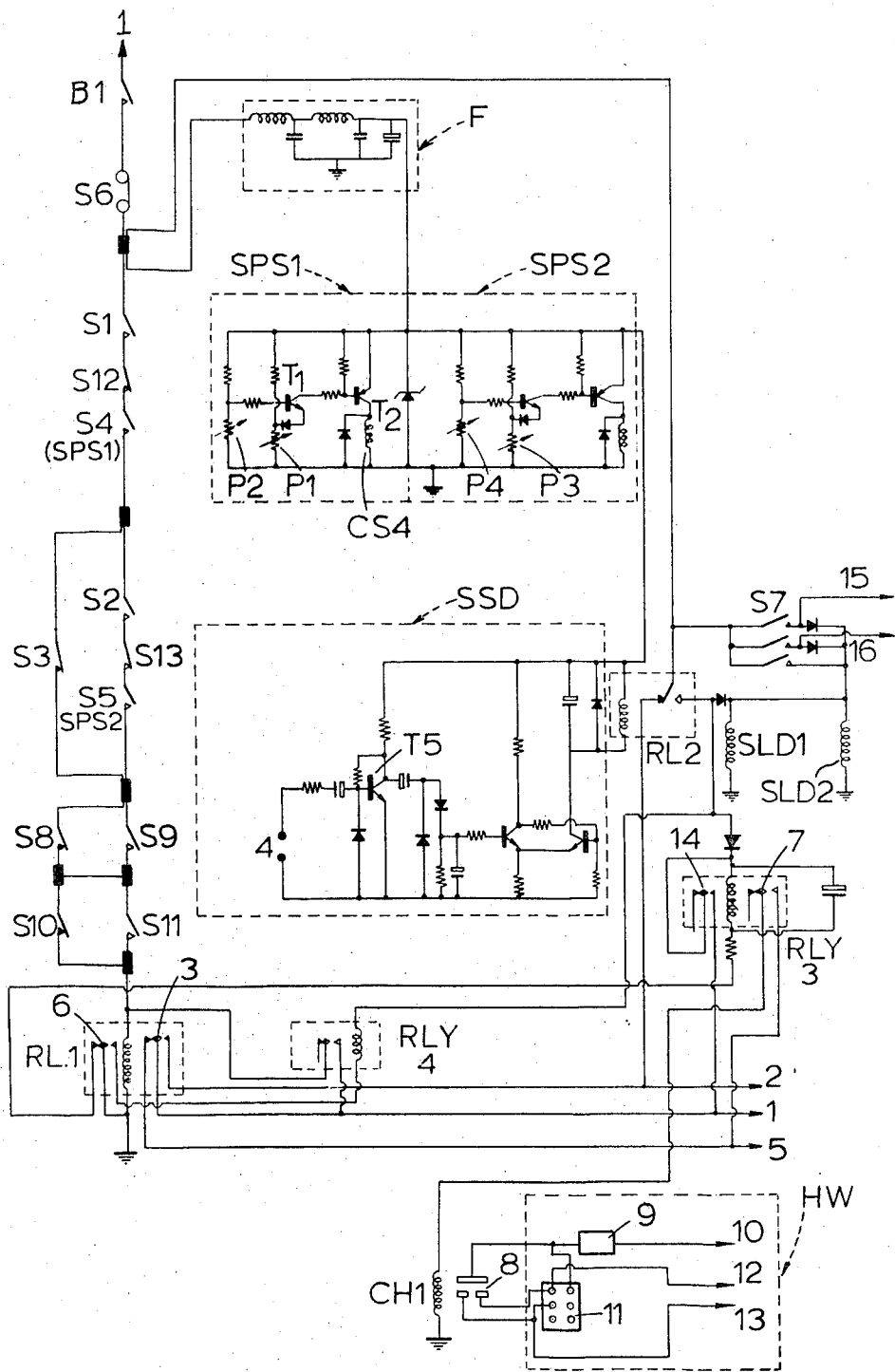

COMPULSORY SEAT BELTS

This invention relates to motor vehicles and concerns means for inhibiting operation of the vehicle, by preventing operation and/or by actuating a warning device, when a seat belt is not being properly worn by a seat occupant.

It has been proposed heretofore to provide means for inhibiting the operation of a vehicle if the driver's seat belt and the seat belt associated with any other occupied seats are not fastened. However, such means do not necessarily ensure that the driver and any passengers are wearing their seat belts since the means is only responsive to the belts being fastened and it has been suggested that some people might simply sit on their fastened belt.

According to this invention a motor vehicle having forwardly and rearwardly adjustable seats and reel wound seat belts includes:

a. means for inhibiting operation of the vehicle until a predetermined amount of belt has been withdrawn from the reel of the seat belt associated with the drivers seat and any occupied passenger seat;

b. means controlled by the position of each adjustable seat for predetermining the amount of belt that must be withdrawn from the associated reel in accordance with the amount of belt that would be withdrawn if the belt were properly worn by an occupant of the seat in its adjusted position.

The means for inhibiting operation of the vehicle may prevent operation of the vehicle by, for example, interrupting the ignition circuit, and/or may discourage operation of the vehicle by actuating a warning device such as a visual and/or an audible indicator.

As a further safeguard, preferably the means for inhibiting operation of the vehicle is also controlled by means responsive to the angle of at least each front seat belt for actuating the inhibiting means when the angle is outside the normal range for a properly worn belt.

Advantageously the vehicle includes a vehicle speed sensing device adapted to override the inhibiting means at speeds below a predetermined minimum.

When the front seats incorporate adjustable back rests each seat may include means controlled by the angle of the back rest for ensuring the predetermined amount of belt that must be withdrawn from the associated reel is varied in accordance with the angle of the back rest.

The means for inhibiting operation of the vehicle may include a multi-position switch coupled to the seat slide and electrically connected to a switch on the inertia reel having a similar number of poles to the multi-position switch so that when the seat is in a given position operation is inhibited until sufficient belt is withdrawn to cause respective poles to make contact; alternatively the inertia reel may be fitted with a screw thread which transverses a probe which actuates a micro-switch, the micro-switch being mounted on a screw thread driven by a flexible cable from a rack and pinion on the seat slide; preferably however the means for inhibiting operation of the vehicle includes a potentiometer driven by the reel, the means controlled by the position of the seat includes another potentiometer and the resistances of the potentiometers are compared electronically to determine when an appropriate amount of belt has been withdrawn from the reel.

Conveniently the vehicle is provided with the known seat sensor switches and seat buckle switches, and advantageously it also includes means for locking the seat buckles at above a certain speed; additionally means may also be provided for locking the seat buckles when the transmission of the vehicle is engaged in gear, and an inertia switch arranged to render the seat buckle locking means inoperative and to break the ignition circuit if the vehicle is involved in a collision.

The invention will now be described by way of example with reference to the accompanying drawing in which the single FIGURE is a circuit diagram illustrating an embodiment of the invention.

More specifically the figure shows a circuit for use in accordance with the invention in relation to a motor vehicle having two forwardly and rearwardly adjustable front seats each provided with an inertia, reel wound, seat belt and two fixed rear seats which are also provided with seat belts.

Each of the four seat belts is of the kind which consists of a diagonal shoulder strap and a lap strap which carries a buckle adapted to be inserted in a socket mounted, for example, between the seats.

The shoulder straps of the front seat belts are each mounted on respective adjacent central pillars, or "B" posts, of the vehicle and each pass through a slot in a pivotable plate also mounted on the pillar and arranged to open a normally closed switch, S12 and S13 respectively, if the angle of the strap is outside the normal range.

Each seat belt socket incorporates a latch which automatically engages the buckle when the latter is inserted into the socket, the latch being manually releasable to allow the buckle to be extracted from the socket and thus enable the occupant of the seat to free himself from the seat belt.

Switches S1, S2, S9 and S11 are incorporated in the four sockets and are normally open, their contacts being closed by insertion of the associated buckle. These switches are in series with an ignition switch B1 and a relay RL1 which is arranged to connect an ignition coil 2 to an ignition supply 1 through a first pair of normally open contacts 3 of the relay RL1.

Normally closed pressure sensitive switches S3, S8 and S10 are fitted to the passengers seats and are connected in parallel with the respective buckle switches S2, S9 and S11 so that when any seat is unoccupied the associated buckle switch is by-passed and thus ineffective.

Thus the vehicle's ignition may be energised, subject to the passenger seats being occupied, by fastening the seat belts and hence closing the switches S1, S2, S9 and S11 and thereby energising the relay RL1 to close the contacts 3.

In order to inhibit operation of the vehicle if the seat belts are fastened but are sat on rather than worn, the circuit includes computers SPS1 and SPS2 respectively associated with the drivers seat and the front passenger seat and arranged to close normally open switches S4 and S5 when an appropriate amount of belt has been withdrawn from the inertia reels.

As will be seen in the circuit diagram computers SPS1 and SPS2 are identical and hence only computer SPS1 will be described.

Computer SPS1 includes a potentiometer P1 which is actuated by the drivers seat to produce an electrical resistance dependent on the fore and aft position of the seat, and which controls the emitter of a transistor T1. P1 is compared electrically with a similar potentiometer P2 driven by worm and wheel from the inertia reel of the seat belt. P2 controls the base of T1. SPS1 also includes a second transistor circuit comprising a transistor T2 and a relay coil CS4 which controls switch S4 which is in series with the switches S1 and S2. Thus, if insufficient belt, as indicated by P2, is withdrawn for a given seat position, as indicated by P1, CS4 will not be energised and the normally open contacts of switch S4 will remain open. Thus the seat position and the amount of belt withdrawn are both sensed and coupled, to produce a single, integrated control condition.

When the front seats incorporate adjustable, or reclining, back rests, the computers SPS1 and SPS2 may each incorporate an additional potentiometer actuated by the back rest to produce an electrical resistance dependent on the adjusted position thereof, and connected in series with the seat position potentiometer, such as P1, so that more belt must be withdrawn from the reel when the back rest is in a forward position. Thus a third parameter may be added to the previous two to again produce a single, integrated control condition which determines the operation of transistor $T_2$.

With the system so far described it would be possible for an occupant to release the seat belt while the vehicle was in motion thus resulting in a sudden loss of power which could be dangerous. Solenoid operated locks SLD1 and SLD2 have therefore been incorporated which prevent release of the front seat belt buckles respectively.

The circuit also includes a vehicle speed sensing device SSD arranged to operate a relay RL2 and thereby energise the ignition circuit at vehicle speeds less than a predetermined low speed; thus the vehicle may be readily manoeuvred, for example into and out of a garage, and the engine may be run for tuning purposes without the need for the driver to be wearing a seat belt.

The speed sensing device SSD comprises a magnetic pick-up 4 which is connected to the base of a transistor T5. The current through T5 is thus controlled by a signal from the magnetic pick-up and this current is applied to a flip-flop circuit which is tuned to a predetermined frequency above which it is conducting and allows current to pass to the coil of the relay RL2 thus causing the seat belt locking relay device SLD1 and SLD2 to be energised and the buckles to be locked in their respective sockets, and breaking the circuit to the ignition coil 2 through the normally closed contacts of the relay.

The speed sensing device may alternatively comprise a centrifugal switch device driven from the gear box.

One minor disadvantage of the system so far described is that when the vehicle is driven slowly, the locking solenoids SLD1 and SLD2 will be energised and de-energised alternately thus resulting in a series of annoying "clicks." This disadvantage is overcome by fitting switches S7 respectively operated by the gear selector mechanism in third and fourth, reverse, and first and second gears so that the locking solenoids SLD1 and SLD2 are energised in all but the neutral position of the gear lever. Thus it is only necessary to select neutral when setting down a passenger to allow the passengers seat belt to be unfastened, and since the speed sensing device operates the seat belt locks through relay RL2 at all but very low speed the lock does not drop out on gear changes. The leads to the circuits of the switches S7 shown in the circuit diagram are connected to an overdrive unit 15 and a reversing lamp 16 in conventional manner.

The vehicle's electricity supply is fed via an inertia switch S6 so that should the vehicle be involved in a collision both the ignition system and the belt locking system are disconnected and the seat belts can be unbuckled.

The rear seats of the vehicle have a similar arrangement to that previously mentioned with reference to the front seats, the essential difference being that because the rear seats are not adjustable fore and aft it is unnecessary to provide a signal indicative of the seat position. In particular the rear seats are provided with pressure sensitive switches S8 and S10 and with buckle switches S9 and S11 as mentioned previously. They may also be provided with buckle locking solenoids similar to SLD1 and SLD2.

The rear seats may also have a simple thread actuated switch fitted to their associated inertia reels in order to give a signal indicative of the length of seat belt which has been withdrawn so as to inhibit the vehicle's ignition system below a minimum seat belt length, as with the front seats.

The normally closed contacts of relay RL1 connect the ignition supply 1 to warning lamps at 5 for illuminating a sign displaying the message "FASTEN SEAT BELTS", which therefore remains illuminated until the driver's belt and the belts of any occupied passenger seats are fastened.

Relay RLY3 is energised by the speed sensing device SSD at any speed above the predetermined low speed if all the seat belts of occupied seats are not properly fastened and worn and hence the normally closed contacts 6 of relay RL1 are closed. When the relay RLY3 is so energised normally open contacts 7 of the relay connect coil CH1 to the ignition supply 1 through the normally closed contacts 3 of relay RL1, and coil CH1 closes contacts 8 thereby operating the normal hazard warning system of the vehicle. The hazard warning system comprises a hazard relay 9 connected at 10 to the vehicle's battery and a hazard switch 11 connected at 12 and 13 to the lefthand and righthand flashers. The normally open contacts 14 of relay RLY3 are connected so that relay locks on even if the vehicles speed falls below the predetermined low speed.

Relay RLY4 prevents loss of ignition if a fault develops when the vehicle is being driven at above the predetermined low speed with the relevant belts correctly fitted and fastened. The relay RLY4 is energised through relay RL2 at above the predetermined low speed through the normally open contacts 6 of relay RL1 when relay RL1 is energised, and relay RLY4 then connects the ignition supply 1 through relay RL1 thereby locking relay RL1 on even if a fault develops which would otherwise disconnect relay RL1 and cause loss of ignition at speeds above the predetermined low speed. It will, of course, be understood that at such speeds the belts which must have been correctly fitted and fastened will be locked by the solenoids SLD1 and SLD2 even when the relay RLY4 is energised.

The circuit also includes a standard filter subcircuit F arranged to smooth any spikes that may occur in the supply to the computer SPS1 and SPS2 due, for example, to the ignition.

What is claimed is:

1. In an automobile having forwardly and rearwardly adjustable front seats and reel wound seat belts, a seat belt safety system coupled to the ignition system of the automobile, comprising the combination of,
   a. means for each seat connected to and actuated by rotation of each reel for sensing the amount of belt withdrawn from the reel,
   b. means for each seat connected to and actuated by movement of said seat for sensing the fore and aft position of the seat,
   c. an electrical supply line including two switches in series, one switch being operated by the belt withdrawal and position sensing means of one of said seats, the other switch being operated by the belt withdrawal and position sensing means of the other of said seats,
   d. a first relay in said supply line which, when said two switches are both closed, causes the ignition system to be energized.
2. The combination of claim 1 including,
   a. an automobile speed sensing means,
   b. a second relay, said speed sensing means coupled to and operating said second relay,
   c. said second relay bypassing said first relay to thereby energize the ignition system at automobile speeds below a predetermined amount.
3. The combination of claim 2 including,
   a. a third relay actuated by said second relay when the speed is above said predetermined speed, said third relay actuating a warning signal should a seat belt become unfastened, said third relay locking in once it becomes energized by said second relay.
4. The combination of claim 2 including,
   a. a third relay, said third relay actuated by said second relay when the speed is above said predetermined speed, said third relay coupled to said first relay and locking said first relay in, to thereby prevent loss of ignition should a fault occur after said predetermined speed is attained.

* * * * *